Patented July 6, 1954

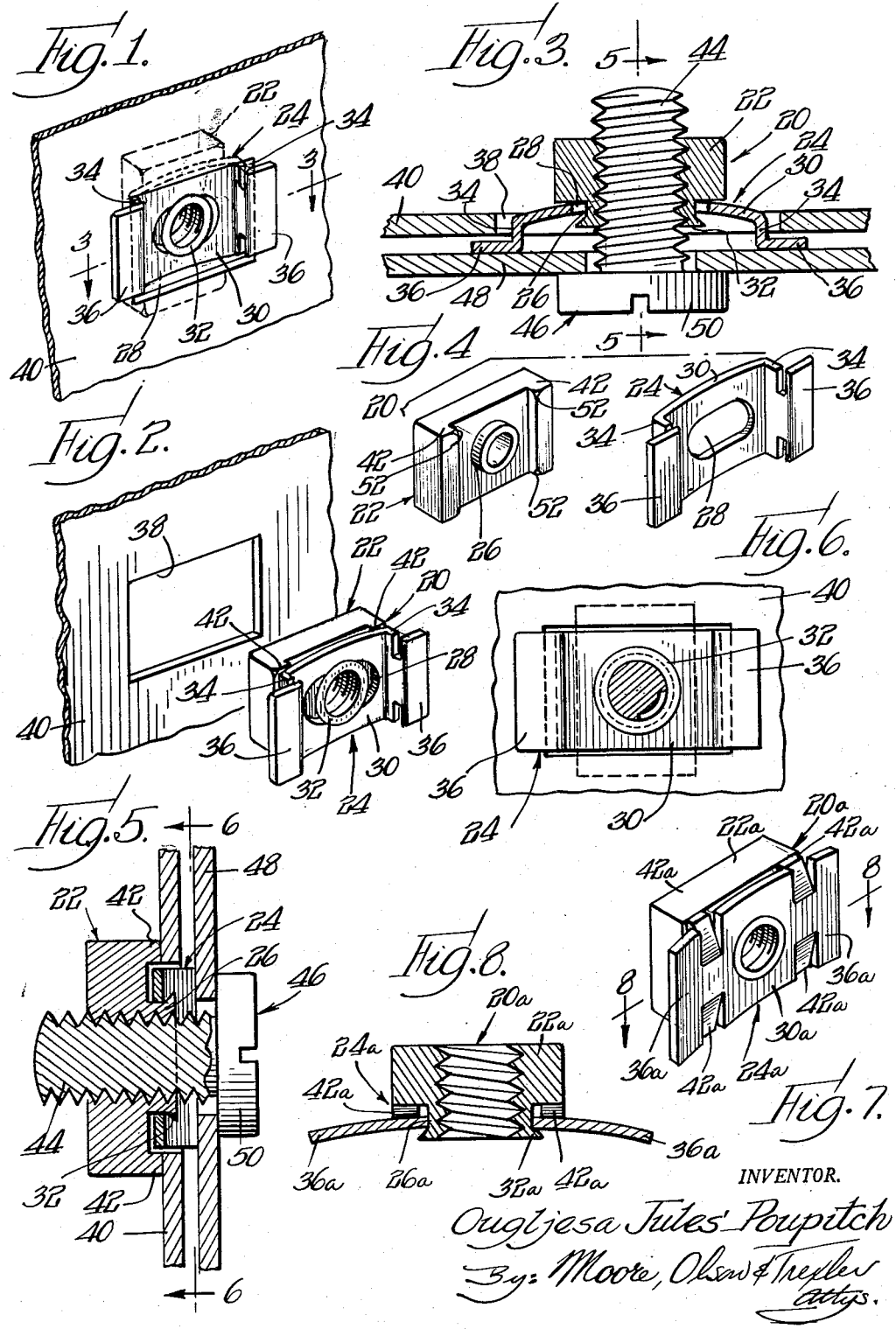

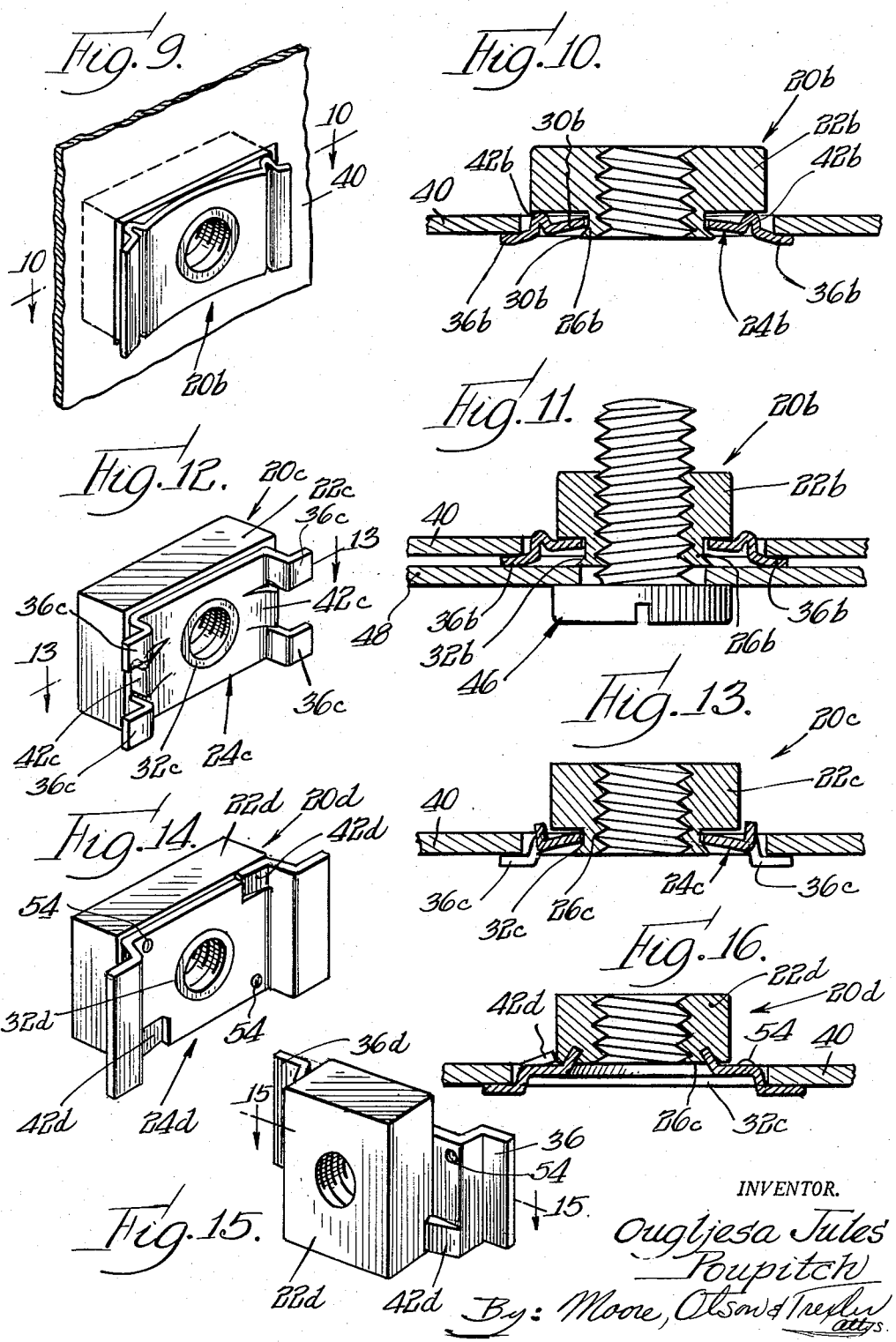

2,682,906

UNITED STATES PATENT OFFICE 2,682,906

NUT CAGE

Ougljesa Jules Poupitch, Chicago, Ill., assignor to Illinois Tool Works, Chicago, Ill., a corporation of Illinois Application March 9, 1950, Serial No. 148,557

6 Claims. (Cl. 151—41.76)

1

This invention relates generally to fastener units and more particularly to fastener units of the type consisting of a rotatable nut member and means for attaching said nut member to an apertured work piece.

Efforts have heretofore been made to secure nuts to apertured work pieces in position for subsequent accommodation of a complementary screw member. The present invention is concerned primarily with the provision of a fastener unit wherein the nut element is rotatable with respect to a retainer member preassembled therewith so as to facilitate initial attachment of the fastener unit to an apertured work piece.

More specifically, the invention contemplates a fastener unit of the type referred to above wherein the rotatable nut member may be inserted within a complementary aperture in a work piece and subsequently rotated so as to cooperate with the nut retainer preassembled therewith in securing the fastener unit to the work piece.

It is a further object of the present invention to provide a preassembled nut and nut retainer member as set forth above, which will permit lateral shifting of the nut within limits after the fastener unit has been secured to the work piece, thereby to facilitate registration therewith of a complementary screw member.

Still more specifically, it is an object of the present invention to provide a preassembled nut and nut retainer member wherein the nut retainer member is formed of sheet metal and is designed for engagement with one side of the work piece in the vicinity of the work aperture, and the clamping side of the associated rotary nut member is designed to engage the opposite side of the work piece in the vicinity of the work aperture so as to secure the fastener unit in screw accommodating position on the work piece.

The present invention also contemplates a preassembled nut and sheet metal nut retainer member as set forth above wherein the nut retainer is apertured to accommodate a neck portion on one side of the nut which is swaged outwardly to provide a retention shoulder, the parts being relatively rotatable for the purposes previously referred to.

The foregoing and other objects and advantages will be more apparent from the following detailed description when considered in connection with the accompanying drawings wherein—

Fig. 1 is a perspective view of a fragmentary portion of a work sheet having a fastener unit of the present invention secured thereto;

Fig. 2 is a perspective view similar to Fig. 1 disclosing the fastener unit in detached relation with respect to the apertured work sheet or piece;

Fig. 3 is an enlarged, horizontal, central, sectional view taken substantially along the line 3—3 of Fig. 1 disclosing a complementary screw in operative association with the fastener unit and securing a work piece in position against the work piece illustrated in Figs. 1 and 2;

Fig. 4 is a perspective view of the nut member and sheet metal nut retainer member prior to the assembly of said parts;

Fig. 5 is an enlarged, central, vertical, sectional view taken substantially along the line 5—5 of Fig. 3;

Fig. 6 is a transverse, sectional view taken substantially along the line 6—6 of Fig. 5;

Fig. 7 is a perspective view of a fastener unit of modified form;

Fig. 8 is a central, transverse, sectional view taken along the line 8—8 of Fig. 7 to illustrate the dished or flexed characteristic of the nut retainer plate;

Fig. 9 is a perspective view similar to Fig. 1, illustrating a still further modification;

Fig. 10 is a central, sectional view taken substantially along the line 10—10 of Fig. 9, illustrating the complementary screw within the nut holding a work piece in position similar to the disclosure in Fig. 3;

Fig. 11 is a sectional view similar to Fig. 10 disclosing the nut rotated through 90° from the position shown in Fig. 10, whereby said nut is secured against relative rotation with respect to the nut retainer member;

Fig. 12 is a perspective view of a fastener unit illustrative of another embodiment of the invention;

Fig. 13 is a central, transverse, sectional view taken along the line 13—13 of Fig. 12 when the fastener unit of Fig. 12 is initially associated with an apertured work piece;

Fig. 14 is a perspective view similar to Fig. 12 illustrating another modified form of the invention;

Fig. 15 is a perspective view of the fastener unit shown in Fig. 14 with the nut thereof rotated through 90° from the position shown in Fig. 14 illustrating the manner in which fingers struck from the nut retainer member secure the nut against relative rotation with respect to said retainer; and Fig. 16 is a transverse, sectional view similar to Fig. 13 disclosing the fastener unit of Figs. 14 and 15 secured in assembled relation with respect to an apertured work piece.

Referring now to the drawings, wherein like numerals have been employed to designate similar parts throughout the various figures, it will be noted that Figs. 1 to 6 inclusive illustrate a fastener unit designated generally by the numeral 20 which is representative of one embodiment of the invention. This fastener unit includes a nut member 22 and a sheet metal nut retainer member 24. The nut 22 is formed with a centrally disposed annular protuberance or neck 26 which extends through an elongated aperture 28 provided in the resilient body or plate section 30 of the retainer member 24. The outer margin of the annular protuberance 26 is flared radially outwardly to provide an annular shoulder 32 which serves to prevent axial separation of the nut and nut retainer member. The nut and retainer member are preassembled with sufficient looseness so as to enable relative rotation between the parts for the purpose hereinafter to be explained.

Attention is directed to the fact that the plate section 30 is preferably slightly bowed. The opposite outer margins of the resilient plate 20 carry spacing flanges 34 extending substantially axially of the fastener unit. Work engaging members or feet 36 extend radially outwardly from the spacer portions 34 and these feet or work engaging elements 36 cooperate with the nut member 22 in securing the fastener unit within the aperture 38 of a work piece 40 in a manner about to be explained.

In Fig. 4 the constituent parts of the fastener unit, namely the nut 22 and sheet metal nut retainer 24, are shown separated prior to the telescopic association with neck 26 with the elongated aperture 28. After this telescopic association is made the portion of the neck 26 projecting beyond the plate portion 30 is suitably swaged or upset so as to provide the retainer shoulder 32 previously referred to. It will be noted from Fig. 4 that the clamping side of the nut 22 is recessed to present oppositely disposed feet 42. When the fastener unit is to be initially applied to the aperture 38 of the work piece, the nut 22 occupies a position with respect to the retainer member 24 as illustrated in Fig. 2. It will be noted that the nut member 22 is preferably of elongated shape which conforms substantially with the size and shape of the rectangular aperture 38. With the parts positioned as shown in Fig. 2 the nut 22 together with the plate 30 and spacer members 34 of the nut retainer 24 may be telescopically associated with the work aperture 38. The retainer feet 36 limit the extent to which the fastener unit may be inserted within the work aperture and when this limiting position is reached the nut 22 may be rotated through 90° so as to position it as shown in Figs. 1, 3, 5 and 6. As the nut reaches the limit of its 90° rotation the feet 42 of the nut automatically overlie and interlock with opposite margins of the plate 30. Thus the nut and nut retainer member are secured against subsequent inadvertent rotation with the feet 42 of the nut overlying one side of the work piece 40 adjacent the aperture 38 and the feet 36 of the nut retainer overlying the opposite side of the work piece 40 adjacent the narrower portions of the work aperture. The nut 22 is now positioned within the apertured work piece to accommodate the threaded shank 44 of a screw member designated generally by the numeral 46.

Attention is directed to the necessity for employing the elongated aperture 28 in the nut retainer member 24 as distinguished from a circular aperture closely approximating the diameter of the neck 26 of the nut. By having the aperture 28 elongated, the nut, after it has been rotated through 90° and thus secured in screw accommodating position, may be shifted laterally within the limits determined by the length of the aperture 28. This is important in instances where it is desirable to have the nut floatingly mounted upon the work. In such applications this floating arrangement facilitates initial registration of the screw shank with the nut. In Figs. 3 and 5 the screw 46 is shown in association with a second work piece or sheet 48, and the head 50 of the screw clampingly engages the outer surface of the work sheet 48. Should the screw be slightly out of registration with the center of the fastener unit 20, the nut may be shifted laterally due to its floating connection with the retainer member 24 so as to bring it into registration with the screw shank 44. It will be apparent from the foregoing that the invention contemplates a fastener unit in which the nut member is designed to overlie one surface of a complementary apertured work piece after the nut has been rotated a given amount with respect to the nut retainer member and the nut retainer member is designed to overlie the opposite side of the work piece, thus cooperating with the nut to secure the parts in a predetermined position within the work aperture. It will be noted also that the nut retainer not only overlies one side of the work piece to prevent axial displacement thereof in one direction, but also extends into the work aperture 38 and thus cooperates with the walls defining the aperture so as to secure the retainer against rotation with respect to the work piece 40. This coaction between the nut retainer member and the walls defining the work aperture assures rotation of the nut with respect to the retainer when a turning force is applied to the nut. When it is desirable to remove the fastener unit from the work aperture it is only necessary to again rotate the nut through 90° so as to bring it into alignment or registration with the retainer plate as illustrated in Fig. 2. When in this position the fastener unit may be axially withdrawn from the aperture 38. To facilitate retrograde rotation of the nut from its fastened position the internal corners of the feet 42 may be chamfered or relieved as at 52, Fig. 4. This makes it possible for the feet to cam themselves over the adjacent margin or edge of the retainer plate as the nut is urged from its fastened position, shown in Figs. 1, 3, 5 and 6, towards its unfastened position shown in Fig. 2. It will also be seen that additional play or clearance between the fastener unit and the work piece 40 may be obtained by making the aperture 38 slightly larger than the external dimensions of the retainer plate 30. This will contribute to the looseness of the fit of the fastener unit within the work aperture. After the screw 46 has been tightened within the fastener unit as illustrated in Figs. 3 and 5, the retainer plate 30 is under stress and thus increases the frictional grip of the nut threads with the complementary thread convolutions of the screw. In this manner the resilient plate 30 of the nut retainer member functions not only to secure the nut against relative rotation with respect to the retainer plate but also serves to lock the screw against inadvertent retrograde rotation with respect to the nut.

In Figs. 7 to 15 inclusive slightly modified forms of fastener units are disclosed. All these fastener units, however, function similarly to the fastener unit 20 just described. The fastener unit disclosed in Figs. 7 and 8 is designated generally by the numeral 20a. The nut 22a conforms structurally with the nut 22 in that it is provided with the annular protuberance or sleeve 26a and the extruded or upset shoulder 32a for securing a nut retainer member 24a against axial separation from the nut. The nut 22a differs from the nut 22 in the omission of the feet 42 illustrated in Figs. 1 to 6 inclusive. It is not necessary to employ feet on the nut 22a because the retainer member 24a is provided with struck-out fingers 42a which function to engage opposite sides of the nut 22a when it has been rotated 90° from the position shown in Fig. 7. In other words, the distance between the two upper pairs of fingers 42a as well as the distance between the two lower pairs of fingers 42a, Fig. 7, is slightly greater than the width of the nut 22a so as to accommodate the nut therebetween and thus hold the nut against relative rotation with respect to the retainer member. It will be noted that in longitudinal cross section the retainer member 24a is flexed and that the opposite extremities of the plate portion 30a carry feet or extensions 36a which function similarly to the feet 36 previously described. While the fastener unit 20a does not provide for any play between the nut retainer member and the nut this could be accomplished, if desired, by enlarging the aperture in the nut retainer member. The flexed construction of the retainer member permits lateral stressing thereof when a screw member is tightened within the nut 22a in a manner similar to that described in connection with fastener unit 20.

Figs. 9 and 10 disclose a fastener unit of modified form designated generally by the numeral 20b which includes a nut member 22b structurally identical with the nut member 22a previously described. A spring nut retainer member 24b is apertured to accommodate the annular protuberance 26b and a swaged shoulder 32b prevents axial separation of the retainer and nut. The nut is free to rotate with respect to the retainer and the body or plate section 30b of the retainer is flexed as and for the purpose set forth in connection with the previous description of the fastener unit 20a of Figs. 7 and 8. Instead of employing struck-out elements or fingers such as the elements 42a of the fastener unit 20a, the retainer member 24b is formed with outwardly bent abutments 42b which serve to accommodate the nut 22b therebetween, Fig. 11, when the nut is turned to its locked position overlying surface portions of the work piece 40. This occurs when the nut 22b is rotated through 90° from the position shown in Figs. 9 and 10 to the position shown in Fig. 11. Feet or work engaging portion 36b are adapted to underlie the work piece 40. It will be apparent that when the nut 22b is positioned as shown in Fig. 11, it will overlie one side of the work piece 40 and the feet 36b will overlie the opposite surface of the work piece in the vicinity of the work aperture. When the screw member 46 is applied so as to fasten the work piece, the sheet metal nut retainer is flexed so as to secure the parts against loosening. Obviously increased clearance may be provided between the aperture and the retainer member if a floating mounting of the nut upon the work piece is desired or the shape and size of the aperture in the retainer member may be varied to permit lateral shifting of the nut therein.

Figs. 12 and 13 disclose a still further modified fastener unit designated generally by the numeral 20c. The nut retainer 24c is very similar to the retainer 24 previously described, the main difference being in the means for securing the nut against rotation after it has been turned 90° from the position shown in Fig. 12. This locking means consists of a pair of spring fingers 42c which are adapted to spring outwardly and to overlie opposite sides of the nut 22c when the nut is rotated 90° from the position shown in Fig. 12 to the position shown in Fig. 13. Thus, when the nut is so positioned it will overlie surfaces of the work piece adjacent the periphery of the aperture and feet 36c will overlie the opposite surface of the work piece similar to the manner in which the feet 36 cooperate with the nut 22 previously described.

Figs. 14 to 16 inclusive illustrate a still further modified fastener unit designated generally by the numeral 20d. The retainer member 24d of the fastener unit 20d differs from the retainer member 24c in the use of struck-out fingers 42d and dimples 54 for securing the retainer and nut against rotation after the nut has been rotated from the position shown in Fig. 14 to the position shown in Fig. 16. With the nut 22d positioned as shown in Fig. 16, it overlies the work surface on one side adjacent the work aperture and feet 36d overlie the opposite side of the work. The manner in which the sheet metal retainer 24d is rotatably coupled with the nut 22d differs from the couplings previously described. The nut retainer 24d is provided with an annular retainer flange 56 of frusto-conical shape. The outer margin of this frusto-conical retainer flange is loosely held within a recess extending inwardly from the clamping face of the nut body. The shoulder portion 32d is forced or swaged into underlying relation with respect to the flange 56 after initial telescopic association of said flange with a preformed annular recess on the clamping side of the nut. The nut retainer members of the fastener units previously described incorporate a bowed plate section intermediate the feet of the retainer whereas the plate portion of the retainer member 24d is not bowed. In other words, the body or plate section of the nut retainer 24d is not as flexible transversely as the previously described nut retainers.

In instances where it proves inconvenient to apply turning torque to the nut element from the side of the work aperture oppositely disposed from the nut retainer, a simple tool (not shown) consisting of an elongated handle and a reduced extremity having a partial thread convolution conforming with the thread helix of the nut, may be applied from the opposite side of the nut. After the nut has been shifted to its work overlying position, the tool may be reversely rotated to release it from the nut. Obviously, this is only one form of turning device that may be applied, and in instances where the nut periphery is readily accessible, a suitable turning tool may be employed.

From the foregoing it will be apparent that the present invention contemplates an improved fastener unit comprising a nut and a retainer therefor of very simple and practical construction. The nut is preferably polygonal in shape and slightly modified to provide means for rotatably coupling the sheet metal retainer as a unit therewith and the retainer constitutes a simple stamping capable of economical production. In the disclosed embodiments the nut members are of rectangular shape, or in other words, non-uniform diameter. Obviously various nut shapes may be employed wherein a maximum nut diameter permits overlying of the work surface and a minimum diameter permits insertion of the nut within the work aperture. By having the constituent elements of the fastener unit relatively rotatable, it is possible to employ the nut on one side of a work piece and the extensions or feet of the sheet metal retainer member on the opposite side of a work piece or sheet to secure the unit in the desired position within the work aperture. In instances where desired, the fastener unit lends itself for a floating mounting upon the work piece. Obviously the manner in which the nut and complementary retainer member are rotatably coupled and secured against axial separation may be varied providing it is possible to apply the unit from one side of a work piece and thereafter effect relative rotation of the nut with respect to the sheet metal retainer. In other words, while certain specific structural features are disclosed herein, it should be understood that other changes and modifications may be made without departing from the spirit and scope of the appended claims.

The invention is hereby claimed as follows:

1. A two-piece fastener unit including a solid nut member of substantial thickness having major and minor transverse axes, and an apertured resilient sheet metal nut retainer element preassembled with said nut member on the clamping side thereof, said retainer member having an overall length greater than the length of the major axis of the nut so as to provide a pair of opposed shoulders at margins of said retainer member adapted to overlie one surface of a complementary work piece having a non-circular aperture for accommodating said nut member, means securing said retainer and nut means against the axial separation and permitting relative rotation thereof, the clamping side of the nut member and the shoulders of said retainer member being spaced axially to accommodate the work piece therebetween, abutment means formed integral with said retainer member for engaging the wall defining the non-circular aperture in said complementary work piece whereby to prevent rotation and to limit laterally displacement of said retainer member relative to the work piece, and axially extending interengaging means including an abutment section on the nut member and a complementary abutment section on the retainer member positioned intermediate the opposed shoulders thereof for resisting relative rotation of the nut and retainer members in opposite directions after said nut member has been rotated to position the major axis thereof in overlying relation with the surface of the work piece opposite to the surface engaged by the shoulders of said retainer member.

2. A two-piece fastener unit as set forth in claim 1, wherein the aperture in the retainer member is elongated to provide relative floating movement of the parts within given restricted limits.

3. A two-piece fastener unit as set forth in claim 1, wherein the means for resisting relative rotation of the nut and retainer members include resilient finger means deflected out of the stock of the sheet metal retainer member.

4. A two-piece fastener unit as set forth in claim 1, wherein the means for resisting relative rotation of the nut and retainer members include spaced opposed shoulders on the clamping face of the nut member adapted to coact with complementary portions of the sheet metal retainer member.

5. A two-piece fastener unit as set forth in claim 1, wherein the means for resisting relative rotation of the nut and retainer members include spaced ribs on the sheet metal retainer member adapted to cooperate with opposed sections of the nut.

6. A two-piece fastener unit as set forth in claim 1, wherein the abutment means formed integral with the retainer member for engaging the wall defining the non-circular aperture in the complementary work piece are relieved to permit relative floating movement within given limits between the retainer member and the apertured work piece.

References Cited in the file of this patent

UNITED STATES PATENTS

| Number | Name | Date |
|---|---|---|
| 890,285 | Krantz | June 9, 1908 |
| 1,579,875 | Lundberg | Apr. 6, 1926 |
| 1,644,153 | Schriner | Oct. 4, 1927 |
| 1,694,580 | Carr | Dec. 11, 1928 |
| 1,744,488 | Mitchell | Jan. 21, 1930 |
| 1,872,385 | Andren | Aug. 16, 1932 |
| 1,878,579 | Gober | Sept. 20, 1932 |
| 1,924,695 | Olson | Aug. 29, 1933 |
| 1,985,333 | Wiley | Dec. 25, 1934 |
| 2,255,649 | Burke | Sept. 9, 1941 |
| 2,283,122 | Murphy | May 12, 1942 |
| 2,326,285 | Burke | Aug. 10, 1943 |
| 2,369,865 | Spencer | Feb. 20, 1945 |
| 2,381,233 | Summers | Aug. 7, 1945 |
| 2,572,588 | Bedford | Oct. 23, 1951 |